Jan. 17, 1939.　　　R. H. ROSENBERG　　　2,143,998
BRAKE MECHANISM
Filed Aug. 17, 1937　　　2 Sheets-Sheet 1
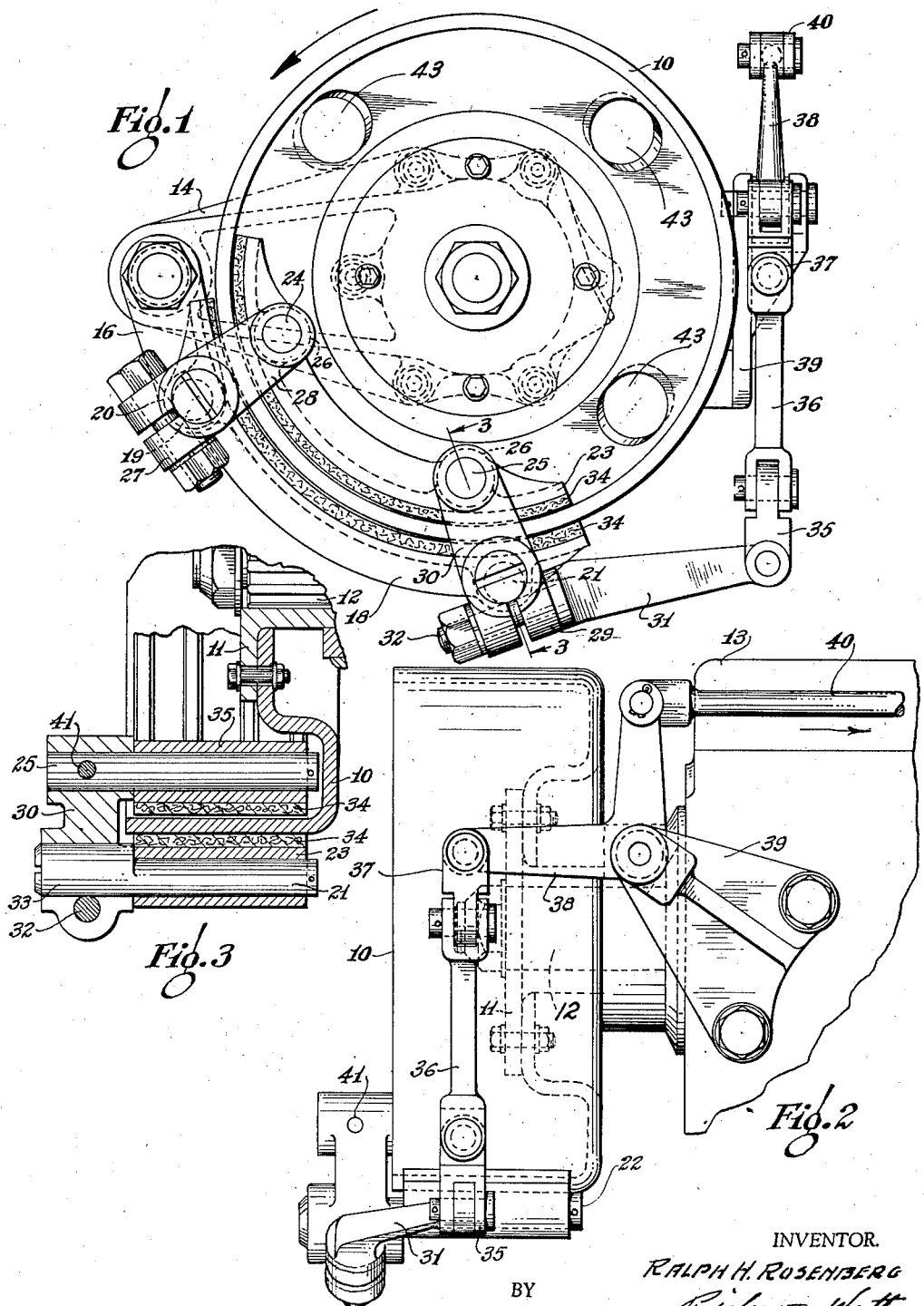
INVENTOR.
RALPH H. ROSENBERG
BY Richey & Watts
ATTORNEYS Jan. 17, 1939. R. H. ROSENBERG 2,143,998
BRAKE MECHANISM
Filed Aug. 17, 1937 2 Sheets-Sheet 2

INVENTOR.
RALPH H. ROSENBERG
BY
ATTORNEYS

Patented Jan. 17, 1939

2,143,998

UNITED STATES PATENT OFFICE 2,143,998

BRAKE MECHANISM

Ralph H. Rosenberg, Detroit, Mich., assignor, by direct and mesne assignments, to Detroit Duo-Grip Brake Corporation, a corporation of Michigan Application August 17, 1937, Serial No. 159,511

10 Claims. (Cl. 188—76)

This invention relates broadly to brakes for motor vehicles and more specifically to improvements in the brake shoe actuating mechanism and the supporting linkage therefor.

One of the objects of the invention is to provide a brake shoe actuating mechanism having an adjustment therein for the equilization of brake shoe pressure upon the brake drum.

Another object of the invention is to provide an internal and external shoe actuating mechanism which is constructed to effect the simultaneous and uniform movement of the shoes, and to avoid the imposition of undue strain and the consequent deflection during the operation of the brake.

Another object of the invention is to provide a brake shoe supporting structure which is adapted to maintain the loads imposed upon the respective shoes in balanced relation.

Another object of the invention is to provide a brake operating mechanism which is constructed to facilitate the ready adjustment of parts thereof which is durable of structure and economic of manufacture.

Other objects and advantages more or less ancillary of the foregoing and the manner in which all the various objects are realized will appear in the following description which, considered in connection with the accompanying drawings, sets forth the preferred embodiment of the invention.

Referring to the drawings in which the embodiment of the invention is illustrated as applied upon a propeller shaft of a motor vehicle.

Fig. 1 is a front elevational view of a propeller shaft and brake drum of an automobile and the brake mechanism embodying the present invention;

Fig. 2 is a side elevational view of the brake mechanism illustrated in Fig. 1 including a fragmentary portion of an automobile transmission housing;

Fig. 3 is a sectional view of a fragmentary portion of the brake drum assembly and the brake operating mechanism embodying the present invention, the section being taken on a plane indicated by the line 3—3 in Fig. 1;

Figure 4:
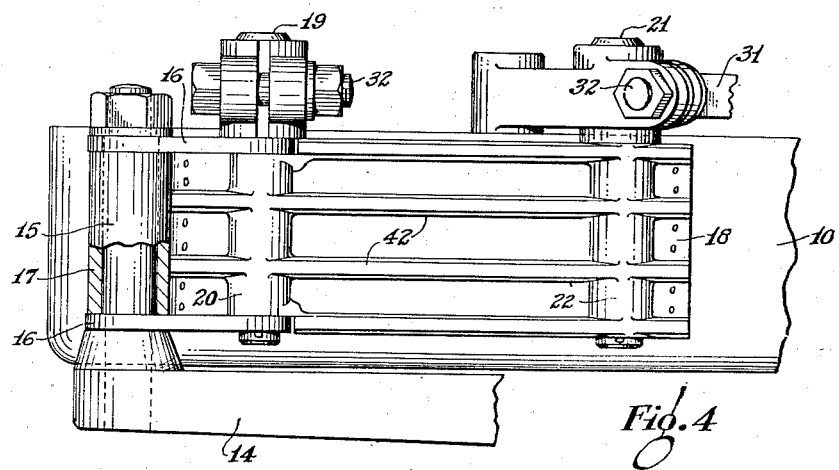
Fig. 4 is an inverted plan view of the external brake shoe, including certain component parts of the brake linkage assembly.

Referring first to Fig. 2 the brake drum 10 is bolted to the flanged portion of a sleeve 11 mounted upon the splined end of a drive shaft 12 extending from the transmission housing 13. Upon the rearward face of the transmission housing there is an arm 14 having a pintle 15 in the outer end thereof for the support of the brake shoes and actuating mechanism therefor. The anchor post or pintle 15 is disposed in parallel relation to the outer face of the flange of the brake drum 10 and is of a length substantially equal to the width of the flange. The free end of the pintle is threaded for the reception of a nut which is provided for the retention of a pair of links 16 pivotally mounted upon the pintle and held in spaced relation thereon by a sleeve 17. The external brake shoe 18 is suspended from the links 16 by a pin 19 pivotally mounted in a boss 20 in the outer face of the brake shoe adjacent the end thereof. The opposed end of the brake shoe 18 is supported by a pin 21 mounted for pivotal movement in a boss 22 formed in the end portion of the shoe. The internal brake shoe 23 is similarly supported by pins 24 and 25 fulcrumed in bosses 26 in the end portions of the shoe. The outer ends of the pins 19 and 24 are secured in an arm 27 which, together with the pins comprise a fork assembly 28 fulcrumed upon the pin 19 and movable in the path defined by the oscillation of the links 16. The pins 21 and 25 supporting the opposed ends of the brake shoes 18 and 23 are secured in an arm 29, the pin and arm assembly comprising a fork 30 which is fulcrmed upon the pin 21 for movement radially towards and circumferentially about the brake drum 10 upon actuation of the brake operating lever 31. The arms 27 and 29 are formed with split bosses in the outer ends thereof which are machined to retain draw bolts and nuts 32 for clamping the eccentric head portion 33 of the pin 19. The eccentrics 33 are provided to facilitate adjustment of the brake shoes, compensative of wear of the brake lining 34, and to facilitate independent adjustment of each end of each shoe relative the periphery of the brake drum. The brake actuating lever or arm 31 is preferably constructed with a threaded shank adapted for assembly within the bore of the split boss in the arm 29. The lever 31 is disposed in angular relation to the arm 29, the assembly comprising the pins, arm and lever constituting a bell crank which is fulcrumed upon the pin 21 in the outer end of the external brake shoe 18. Upon the end of the lever 31 there is a shackle 35 pivotally connected to a link 36 and coupled through a second shackle 37 to a bell crank 38 fulcrumed upon a bracket 39 secured to the transmission housing 13. The upper arm of the bell crank 38 is pivotally connected to a rod 40 which is connected to the brake actuating lever, not shown, in the customary manner.

The inner brake shoe 23 is formed so that the area of the brake drum engaging surface is equal to that of the external brake shoe 18, the upper or leading edge of the internal brake shoe being disposed circumferentially forward of the end portion of the external shoe. The forks 28 and 30 are preferably formed from forgings having the pins for the internal brake shoes assembled in the arms and retained therein by pins or keys 41.

The brake shoes are formed with ribs 42 extended throughout their length and provided to prevent deflection of the end portions thereof. The supporting pin bosses 20, 21 and 25 and 26 are disposed in spaced relation with the ends of the respective brakes in order to accommodate the assembly of rivets for the securement of the brake lining 34 upon the face of the shoes.

Figure 5:
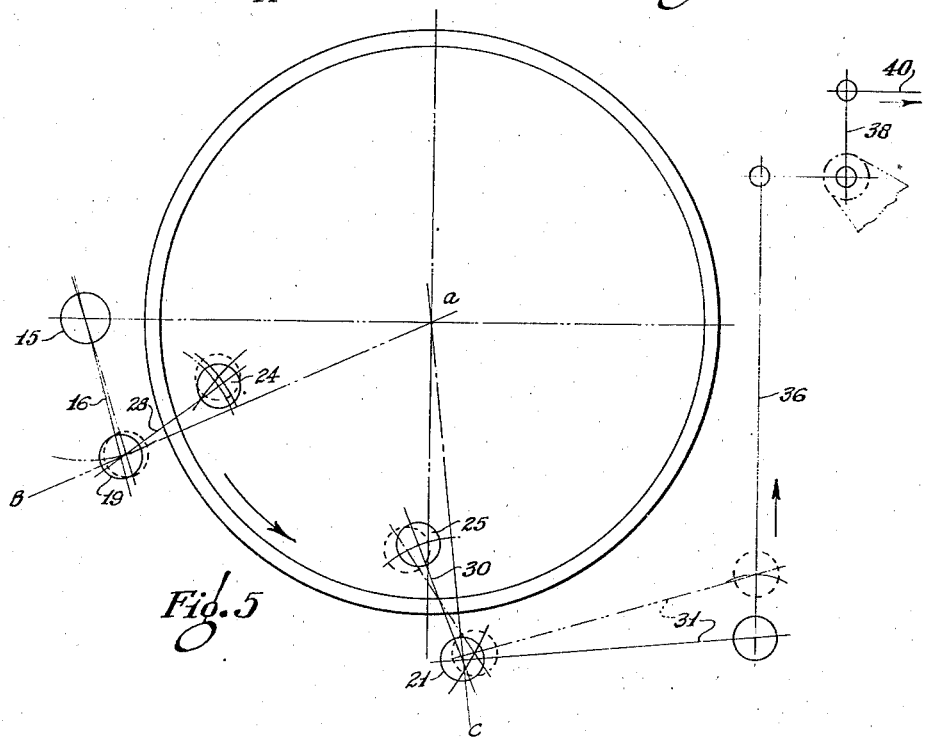
Fig. 5 is a diagrammatic view of the brake drum and brake actuating mechanism illustrating the disposition and angular relation of the brake shoe supporting forks and the actuated position of the forks.

As illustrated diagrammatically in Fig. 5 when the pull rod 40 is actuated in the direction of the arrow, the brake operating lever 31 is elevated to the position indicated in dotted lines, while the external brake shoe and pin 21 are moved circumferentially about and towards the brake drum. The movement of the pin 21 causes the bell crank assembly to be rocked upon its fulcrum and effects the translation of the internal brake shoe towards the fork 28 and also towards the inner periphery of the drum 10. Upon actuation of the pin 24 the fork 28 is twisted or rocked upon its fulcrum 19, thus causing the links 16 to swing inwardly and carry the pin 19 towards the brake drum. As illustrated by the dotted line position of the forks the distance between the pins and periphery of the brake drum is foreshortened upon actuation of the lever 31 and the resultant oscillation of the forks 30 and 28 upon their fulcrums. Since the internal brake shoe is supported by the forks or linked connection to the external brake shoe it will be readily recognized that the movement of the two shoes will be uniform and equal and that adjustment of the arm 31 will cause the shoes to impinge the flange of the brake drum 10.

It will be noted that the movement of the external brake shoe is restricted at its upper end by the pendulous movement of the links 16 but that the opposed end of the external brake shoe is advanced circumferentially about the drum and radially inward when the bell crank assembly of the fork 30 is twisted upon its fulcrum bearing in the end of the external brake shoe. Likewise the circumferential movement of the upper end of the internal shoe is less than that of the opposed end thereof. However, as is apparent in Fig. 1 and Fig. 5 the inner end of the arm 29 is inclined toward the periphery of the drum more than the inner end of the arm 27, thus though the pin 25 moves through a greater arc than the pin 24, the angle of movement thereof towards the brake drum flange is sharper than the angular movement of the pin 24, hence the timed relation of movement of the two pins, as provided herein, is so equalized as to effect uniform engagement of the full area of the shoes with the brake drum and the simultaneous equi-distant movement of two shoes toward and away from the drum. The web of the brake drum 10 is preferably provided with a plurality of holes 43 drilled at an angle which will induce the circulation of air into the drum and over the internal brake shoe member.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A brake mechanism comprising a brake drum, an internal and external brake shoe coordinated therewith, an anchor post, a fork member pendulously mounted thereon and mounted for oscillatory movement relative thereto, an end of said internal and external brake shoes being pivotally supported upon said fork, a second fork pivotally connected with the opposed ends of said brake shoes, and means for oscillating one of said forks.

2. A brake mechanism comprising a brake drum, an internal and external brake shoe coordinated therewith, a fixed anchor post, a link pivotally mounted thereon, a fork pivotally mounted on said link, an end of the internal and external brake shoe being pivotally mounted on said fork, a second fork pivotally connected with the opposed ends of said shoes, and a lever on one of said forks adjacent one of the pivotal connections for oscillating the fork.

3. A brake mechanism comprising a brake drum, an internal and external brake shoe coordinated therewith, a fixed anchor post, links pivotally mounted thereon, a fork comprising an arm and a pair of pins, one of said pins being pivotally mounted in said links and in one of said brake shoes, the other of said pins being pivotally mounted in the other brake shoe, a second fork comprising an arm and a pair of pins, each pivotally mounted in one of said brake shoes, and a lever on the last named fork disposed in relation to one of the pins so that the arm of the fork will fulcrum thereon as said lever is actuated.

4. A brake mechanism comprising a brake drum, an internal and external brake shoe coordinated therewith, a fixed anchor post, links pivotally mounted thereon, a fork comprising an arm and a pair of pins, one of said pins being pivotally mounted in said links and in one end of the external brake shoe, the other of said pins being pivotally mounted in the adjacent end of the internal brake shoe, a second fork comprising an arm and a pair of pins, each pivotally mounted in the opposed ends of the brake shoes and a brake operating lever affixed upon said last named fork adjacent the pin in the external brake shoe.

5. A brake mechanism comprising a brake drum, an internal and external brake shoe coordinated therewith, a fixed anchor post, links pivotally mounted thereon, a fork comprising an arm and a pair of pins, one of said pins being pivotally mounted in said links and in one end of the external brake shoe, the other of said pins being pivotally mounted in the adjacent end of the internal brake shoe, a second fork comprising an arm and a pair of pins, each pivotally mounted in the opposed ends of the brake shoes, the arm of said second named fork being inclined so that the pins of the fork are closer to the periphery of the brake drum than the pins of the first named fork, and an operating arm upon the second named fork adjacent the external brake shoe supporting pin.

6. A propeller shaft brake for a motor vehicle, comprising a brake drum, a pair of brake shoes of equal brake engaging area, disposed respectively adjacent the inner and outer face of the flange of said brake drum, an anchor post, a link pivoted thereon, a fork pivoted thereto and to the outer brake, said fork uniting through pivotal connections said inner and outer brake shoes, a second fork uniting through pivotal connections the opposed ends of said shoes and a control lever affixed to the last named fork and constituting therewith a bell crank fulcrumed upon the pivotal connection of the fork with the outer brake shoe.

7. In a motor vehicle having a transmission case and a propeller shaft, a brake mechanism comprising, a flanged brake drum mounted on said propeller shaft, an internal and external brake shoe adjacent the flanged portion of said drum, an arm affixed to said transmission case, an anchor post therein, links pivotally mounted on said anchor post, a pin pivotally mounted in said link and the end of said external brake shoe, an arm affixed to said pin, a second pin affixed to said arm and pivotally connected to the end of the internal brake shoe, a pin in the opposed end of said external brake shoe, an arm affixed thereto, a second pin affixed to said arm and pivotally connected to the internal brake shoe and a brake operating lever affixed to said arm adjacent the pin in the external brake shoe.

8. A brake mechanism comprising, a brake drum, an internal and external brake shoe coordinated therewith, an anchor post, a link pivoted thereon, a pin having an eccentric head pivotally connected to said link and an end of said external brake shoe, an arm clamped to the eccentric head of said pin, a second pin affixed in said arm and pivotally connected to the end of said internal brake shoe, a pin having an eccentric head pivotally mounted in the opposed end of said external brake shoe, a second arm clamped to the eccentric head of the last named pin, a pin affixed in the second named arm and pivotally connected to said internal brake shoe, and a brake operating lever on said last named arm and extended laterally from a point adjacent the pin in the external brake shoe.

9. A brake mechanism comprising, a brake drum, an internal and external brake shoe coordinated therewith, an anchor post, a link pivoted thereon, a pin pivoted to said link and one end of said external brake shoe, an arm connected to said pin, a second pin secured in said arm and pivoted in one end of said internal brake shoe, a pin in the opposed end of the external brake shoe, an arm connected to said pin, a second pin secured in said arm and pivoted in the opposed end of said internal brake shoe, a brake operating lever mounted on the last named arm adjacent one of the pins therein and means for adjusting the pins in the respective ends of the internal and external brake shoes towards and away from each other.

10. A brake mechanism comprising, a brake drum, an internal and external brake shoe coordinated therewith, an anchor post, a link pivoted thereon, a pin pivoted to said link and one end of said external brake shoe, an arm connected to said pin, a second pin secured in said arm and pivoted in an end of said internal brake shoe, a pin in the opposed end of the external brake shoe, an arm connected to said pin, a second pin secured in said arm and pivoted in the opposed end of said internal brake shoe, a brake operating lever mounted on the last named arm adjacent one of the pins therein, said last named arm being disposed at a more acute angle, relative to a brake drum radius through the external brake shoe pin, than the angle of the first named arm, relative to a brake drum radius through the external brake shoe pin thereof, and adjustable eccentrics in the external brake shoe pins for drawing the respective ends of the internal and external brake shoes towards or away from each other.

RALPH H. ROSENBERG.